United States Patent [19]

Victor

[11] 4,016,917
[45] Apr. 12, 1977

[54] RIM AND BEAD-CLAMP CONSTRUCTION FOR PNEUMATIC TIRES

[75] Inventor: Carl-Gustav Börje Christer Victor, Hollviksnas, Sweden

[73] Assignee: Trelleborgs Gummifabriks Aktiebolag, Trelleborg, Sweden

[22] Filed: Mar. 10, 1975

[21] Appl. No.: 557,146

[30] Foreign Application Priority Data

Mar. 11, 1974 Sweden .............................. 7403187

[52] U.S. Cl. ............................. 152/400; 152/381.1
[51] Int. Cl.² ..................... B60C 5/16; B60C 15/02
[58] Field of Search .......... 152/379, 399, 400, 381, 152/385, 388–391, 381 R

[56] References Cited
UNITED STATES PATENTS

| | | | |
|---|---|---|---|
| 537,537 | 4/1895 | Lambert | 152/399 |
| 542,683 | 7/1895 | Nase | 152/399 |
| 1,429,152 | 9/1922 | Maggiora | 152/400 |
| 3,150,704 | 9/1964 | Daw | 152/400 |
| 3,638,701 | 2/1972 | Rossler et al. | 152/400 |
| 3,780,784 | 12/1973 | Spier | 152/400 |

Primary Examiner—Drayton E. Hoffman
Attorney, Agent, or Firm—Beveridge, DeGrandi, Kline & Lunsford

[57] ABSTRACT

A rim and bead clamp construction for a pneumatic tire is described. Several elongated bead clamps are spaced about the circumference of the rim. Each bead clamp has a clamping bolt extending through a hole in the bottom of the rim and is mechanically and sealingly pressed against the rim bottom. Each bead clamp has jaws at its distal ends for pressing the beads of the pneumatic tire fimly against the rim flanges.

3 Claims, 4 Drawing Figures

RIM AND BEAD-CLAMP CONSTRUCTION FOR PNEUMATIC TIRES

Attempts have been made, particularly in connection with cross-country vehicles, to develop rim constructions which permit running with the tire under extreme loading conditions, and also running with the tire deflated, so-called run-flat driving. Mention can be made, as examples of known constructions, of Swedish patent specifications Nos. 317,003 and 362,217, West German Auslegeschrift 1 505 080 and U.S. Pat. No. 2,028,601 and 2,409,666. In all of these known constructions, apart from the last-mentioned, a circumferential ring has been placed within the rim serving to prevent the rim flanges from being pressed against and crushing the side walls of the tire, if the pneumatic tire is run in the deflated state. These rings placed in the interior of the rim have also been designed to press the tire beads against the rim flanges thereby to obtain a more secure fixing of the tire to the rim. However, the prior art constructions with circumferential rings placed within the rim are complicated and difficult to mount, and so far as the rim constructions according to the above-mentioned Swedish patent specifications are concerned, mounting of the tire requires that the split rim be separated. Thus, mounting requires a great amount of effort and such an operation cannot always be carried out under adverse conditions, for example, in connection with military operations. The rim and spacer ring construction according to West German Auslegeschrift 1 505 080 is based on the same principle with the spacer ring placed in the interior of the tire, although in this case, the ring consists of several separate elements to facilitate mounting. This latter run-flat and clamping construction is, however, still difficult to utilize in the mounting of the tire. Moreover, there is the disadvantage that it is difficult to seal the holes where the anchoring bolts pass through the bottom of the rim. The tire and rim construction according to U.S. Pat. No. 2,028,601 is also complicated and requires separability either of the rim or of the circumferential rings placed in the rim. Neither does this rim construction permit the use of tubeless tires, since the construction lacks the requisite air-tightness.

A disadvantage common to all of the above-mentioned prior art constructions, apart from the construction according to U.S. Pat. No. 2,409,666, is however, the great weight of the constructions, which is naturally a severe disadvantage and limits the loading capacity, while increasing the stresses on the wheel axles of the vehicle, and also makes the balancing of the wheels a difficult operation.

Although, the construction according to the above-mentioned U.S. Pat. No. 2,409,666 has the advantage that it is light in weight, this construction displays serious disadvantages such as, for example, that tubeless tires cannot be used and that the small lugs of the bead clamps rapidly wear and lacerate the inside of the tire beads. Thus, tests with such a construction have indicated that the lugs will rapidly wear into the toes of the tire beads during "run-flat" driving with the tire in the deflated state, causing play between the rim flanges and the tire beads, thereby markedly increasing the risk that the tire be forced off the rim. Moreover, the tire wall is deformed almost crumpled, in such "run-flat" driving.

The object of the present invention is to obviate the disadvantages of the prior art apparatuses and to provide an easily mountable, robust light-weight construction capable of retaining the tire on the rim during run-flat driving without strong tendencies to an unnecessary deformation of the tire walls and abrasion of the tire beads. According to the invention, this has been achieved in that the means for clamping the tire consist of bead clamps spaced about the circumference of the rim and formed as elongated rigid clamping bodies rotatable in the interior of the tire and extending, in their operative position, in the axial sense of the rim, the clamping bodies being arranged, each by means of its respective clamp bolt extending through an aperture in the bottom of the rim, to be mechanically and sealingly pressed against the bottom of the rim and to be pressed against the beads of the tire to force them out against the flanges of the rim.

The invention will be described in greater detail hereinbelow and with reference to the accompanying drawings, on which FIG. 1 is an axial section of a portion of a pneumatic tire mounted on a rim and bead clamp construction according to the present invention;

Figure 1:
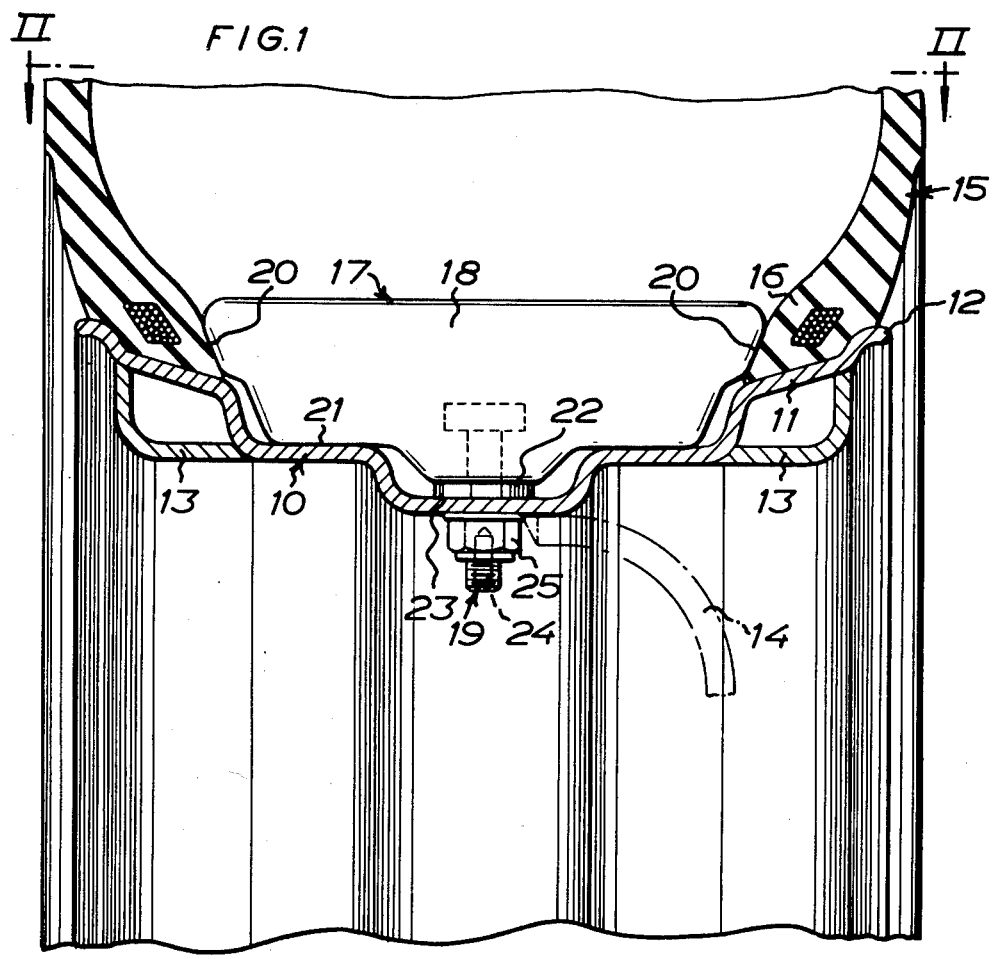

FIG. 1 shows a rim 10 with reinforced rim seats 11 and flanges 12. This reinforcement consists of an angle profile 13 welded to said seats and flanges. A rim disc or spoke structure 14 is shown with broken lines. A pneumatic tire 15 is mounted on the rim so that the tire beads 16 abut against the rim seats 11 and also against the rim flanges 12. According to the invention, the beads are powerfully forced against the flanges 12 by means of bead clamps 17 which are spaced about the circumference of the rim. In normal cases, for example, six or eight uniformly spaced apart clamps can be utilized. However, only one of the clamps is shown in FIGS. 1 and 2 as all of them are of the same construction.

Figure 2:
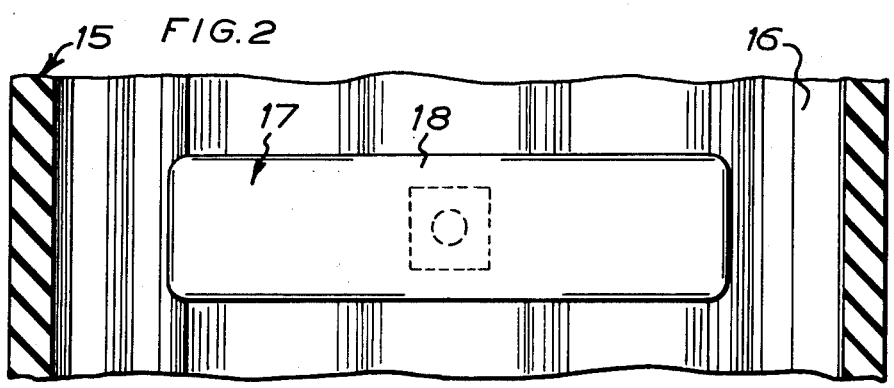
FIG. 2 is a part of a section taken along the line II—II in FIG. 1.

The clamp 17 shown in FIGS. 1 and 2 consists of a cast light metal body 18 with a clamp bolt 19 fixedly embedded therein. Other materials can also be used. The body 18 has abutment or jaw surfaces 20 which are pressed against the tire beads 16 and has, moreover, shoulders 21 which are pressed against the bottom of the rim. Finally, the body 18 has a sealing surface 22 which is pressed against a suitable rubber or plastic gasket 23 abutting against the bottom of the rim so as to provide an air-tight seal about the clamp bolts 19.

There are two methods of mounting the tire on the rim. According to the first method, one bead of the tire is forced over one flange of the rim, and then the clamps are inserted into the tire and into their fixation holes, turning the clamps with their longitudinal direction coinciding with the plane of rotation of the rim. Thus, the clamps are turned 90° in relation to the position shown on the drawing. In connection herewith a mounting tool is connected to a fixing means, therefor, e.g. screwed into a threaded bottom hole 24 in the clamp bolt 19. The outer diameter of this mounting tool should be so small as to allow passing of a nut 25 over the mounting tool. After application of the nut and threading of the mounting tool into said hole, the clamp is pressed into the interior of the partly-mounted tire and is maintained in said position i.e. with its longitudinal direction coinciding with the plane of rotation of the rim. The tire is then finally mounted onto the rim and is inflated to an air pressure of approximately 500 kPa (70 psi). By means of the mounting tool the clamps are then turned 90° to the position shown on the drawings, whereupon the clamps are drawn down towards their mounting position. The nut is then screwed onto the clamp bolt 19 and is tightened such that the clamps are pressed against the beads 16 and a satisfactory seal is obtained by means of the elastomeric gasket 23. The second mounting method commences with the clamps mounted on the rim, the longitudinal direction of the clamps coinciding with the plane of rotation of the rim. The tire is then mounted in the normal way and the clamps are then forced one-by-one into the interior of the tire by means of the mounting tool, in order to be turned to the position shown on the drawing. Finally, each separate clamp is drawn down to its mounting position and the nut 25 is tightened. The mounting tool is then moved to the next clamp, whereupon the mounting sequence is repeated.

Figure 3:
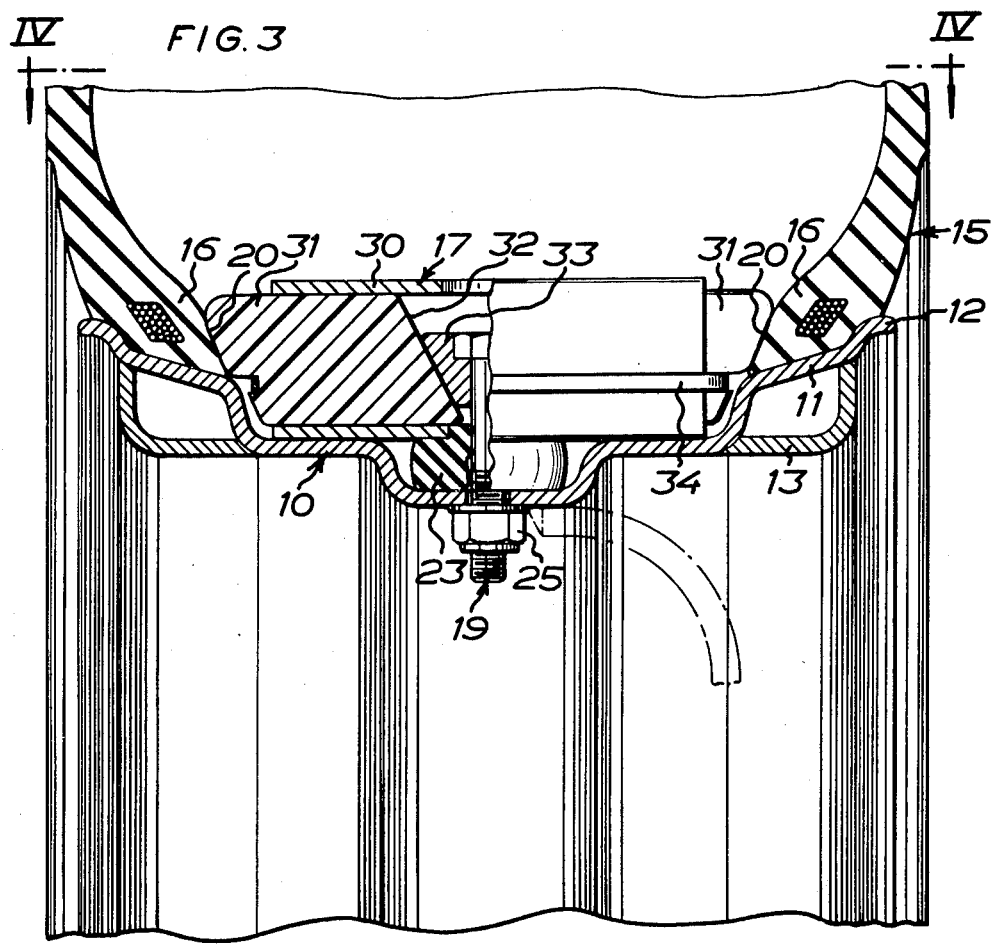
FIGS. 3 and 4 show another embodiment of a construction according to the invention in the same manner as FIGS. 1 and 2.
Figure 4:
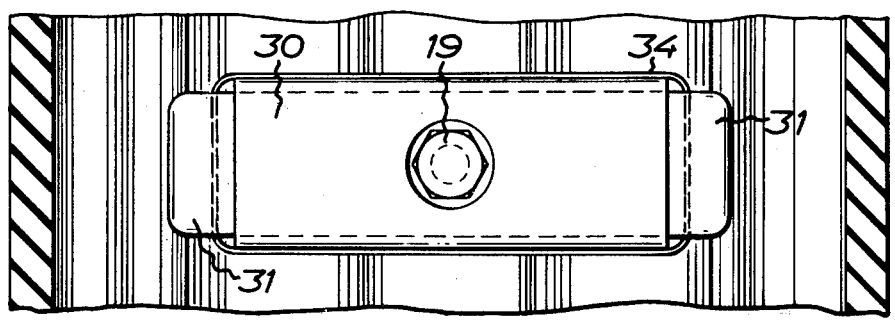

The embodiment of invention according to FIGS. 3 and 4 differs from the earlier described embodiment substantially in that the clamp is of the expanding type. The clamp in FIGS. 3 and 4 consists of a rigid sleeve 30 which is preferably of square cross-section and can consist of metal or rigid plastic. Two pistons 31 are inserted into this sleeve from each end thereof. These pistons can also consist of metal or plastic and display, at their distal ends, abutment or jaw surfaces 20 which correspond to the surfaces 20 in the embodiment according to FIGS. 1 and 2. At their proximal ends, the pistons 31 are provided with bevelled surfaces 32 for cooperation with a wedge 33. For example, a rubber band 34 can be utilized to retain both of the pistons within the sleeve 30. The clamp bolt 19 is cast in one piece with, or fixedly mounted in the wedge 33 in order that by means of the nut 25, the wedge 33 may be drawn down and the pistons 31 may be pressed outwardly towards the beads 16. Mounting of this clamp is effected in the same way as the mounting of the clamp according to FIGS. 1 and 2, and the clamp bolt 19 has a threaded bottom hole (not shown) for the mounting tool. The expanding clamp shown in FIGS. 3 and 4 permits the application of a variable pressure, which may be advantageous in certain cases.

Both of the above-described embodiments of the construction according to the invention possess great advantages. Thus, the clamps will, in the event of a puncture, fixedly clamp the beads against the flanges with a force which replaces that exerted by the air pressure. The clamping of the beads also prevents the tire from slipping on the rim, and consequently the tire can transfer driving power and braking forces even when punctured. As a result, the vehicle will retain substantially unchanged mobility over terrain and on roads, even after a puncture. The clamps — not to be compared with the prior art "run-flat" rings on the inner side of the rim as they are based on an entirely different principle — will provide by their design a clamping force of sufficient size to permit running the tire at extremely low air pressures in cases where, for example, additional carrying capacity or additional traction is required for driving over very loose ground. Moreover, the clamps permit the use of tubeless tires even in off-the-road driving, without running the risk of slow leaks as a result of foreign matter penetrating between the tire wall and the rim flange. An important advantage of the fact that the clamps are designed to mechanically abut both the bottom of the rim and the tire beads, is that the clamps are stabilized and prevented from breaking up or tilting as a result of the great stresses arising in run-flat driving.

If, moreover, use is made of the clamps in combination with a lubricant, it is possible to run punctured tires for longer distances. If the damage is only caused by pointed weapons or small arms, it is, in fact, not necessary to dismount the tire from the rim, the hole being simply plugged, whereupon the tire is inflated and once again becomes functional.

In fact, the clamps in the construction according to the invention are so effective that the tire would be retained on the rim even if it were to be blown up by being driven over a landmine. In view of the fact that the tire remains on the rim despite such serious damage, it is possible to continue to use the damaged tire for transferring driving power and braking forces and for providing the wheel with carrying capacity. A damaged tire retained on the rim is, of course, better than the rim alone.

It has earlier been mentioned that the clamp in the construction according to the invention can be made very light in weight. Thus, it should be observed that in utilizing six clamps in a normal off-the-road-tire, a weight-increase of only 5–10 kg is obtained, as compared with other tubeless cross-country tires. This low weight should be compared with, for example, the construction according to West German Auslegeschrift 1 505 080 in which the weight-increase as a result of the run-flat spacer ring construction amounts to 40–50 kg per tire.

Another great advantage with the construction according to the invention is that it is not necessary to use a split rim for mounting the clamps, that is to say, the clamps fit both flat-base rims and drop-centre rims.

What I claim and desire to secure by Letters Patent is:

1. A rim and bead clamp construction comprising a rim with flanges and a rim bottom and several bead clamps spaced about the circumference of said rim, each of said bead clamps being formed as an elongated rigid body, jaw means on the distal ends of each of said bead clamps applying radially inward and axially outward forces against the beads of a pneumatic tire to be mounted on said rim to force the beads out against the flanges of said rim and to maintain an airtight seal between the bead and the rim even when the tire is in a partially deflated condition, a clamping bolt connected to and extending from each of bead clamps and arranged centrally between its ends, bottom wall portions of the rim bottom of said rim defining an aperture for said clamping bolt of each of said bead clamps, and resilient gasket means around said clamping bolt of each of said bead clamps, said bead clamps being rotatable in the interior of the tire from a tire-mounting position where their elongated directions coincide with the plane of rotation of the rim to an operative clamping position where their elongated directions extend in the axial direction of said rim, said bead clamps while in said clamping position having shoulders which are pressed against the bottom of said rim to stabilize the bead clamps and prevent them from tilting during run flat driving, said bead clamp having a central surface area spaced from the rim in the area surrounding said clamping bolt, said central surface area pressing said resilient gasket against the bottom of the rim to provide an air-tight seal around the clamping bolt when shoulders are pressed against the bottom of said rim, said rim having a recess which provides the spacing between the rim and the central surface area of the bead clamp.

2. A rim and bead clamp construction according to claim 1, wherein each of said bead clamps is formed as an expansion device, comprising a rigid guiding sleeve, two pistons placed on line with each other in said rigid sleeve and extending with their distal jaw ends therefrom, cam means on the proximal ends of said pistons, wedge means placed between said pistons in said sleeve for cooperation with said cam means, said clamping bolt being connected to said wedge means, and wall portions on said sleeve forming a centrally placed aperture, said clamping bolt extending therethrough.

3. A rim and bead clamp construction according to claim 1 wherein the jaw means, shoulders and central surface area of the bead clamp are rigidly interconnected.

* * * * *